United States Patent [19]

Ueda et al.

[11] 4,168,935
[45] Sep. 25, 1979

[54] APPARATUS AND METHOD FOR CONTROLLING WATER TURBINE

[75] Inventors: Tsuneo Ueda; Seiichi Sohmiya, both of Kawasaki, Japan

[73] Assignee: Fuji Electric Co., Ltd., Kawasaki, Japan

[21] Appl. No.: 869,342

[22] Filed: Jan. 13, 1978

[51] Int. Cl.² ............................................. F01D 17/08
[52] U.S. Cl. .......................................... 415/1; 415/20; 415/29; 415/43
[58] Field of Search .................. 415/1, 17, 20, 29, 30, 415/43

[56] References Cited

U.S. PATENT DOCUMENTS

| | | | |
|---|---|---|---|
| 2,283,127 | 5/1942 | Rheingans | 415/20 |
| 2,727,523 | 12/1955 | Brown | 415/43 |
| 3,063,460 | 11/1962 | Krauss | 415/20 |
| 3,084,906 | 4/1963 | Wheeler | 415/20 |
| 3,891,999 | 7/1975 | Ueda et al. | 415/1 |
| 4,097,183 | 6/1978 | Namikas et al. | 415/1 |

*Primary Examiner*—Everette A. Powell, Jr.
*Attorney, Agent, or Firm*—Sughrue, Rothwell, Mion, Zinn and Macpeak

[57] ABSTRACT

An apparatus for controlling a water turbine is disclosed wherein an auxiliary servomotor having a capacity substantially equal to that of a servomotor for actuating pressure regulator is provided for actuating flow control guide vanes, the auxiliary servomotor for the guide vanes and the servomotor for the pressure regulator being connected through pipe lines. The guide vanes for the water turbine are controlled according to a position of an auxiliary servomotor for the governor and the servomotor for the pressure regulator is controlled according to a difference between the opening position of the guide vanes and the set position of a load limiter for the water turbine. At the time of free running of the water turbine utilizing the governor, the pressure regulator is operated in response to the open- and closing operation of the guide vanes to suppress any variation in the water flowing speed in a penstock, and at the time of the load-limiting operation of the water turbine, the pressure regulator is fully closed for minimizing ineffective flow of water.

8 Claims, 1 Drawing Figure

U.S. Patent    Sep. 25, 1979    4,168,935
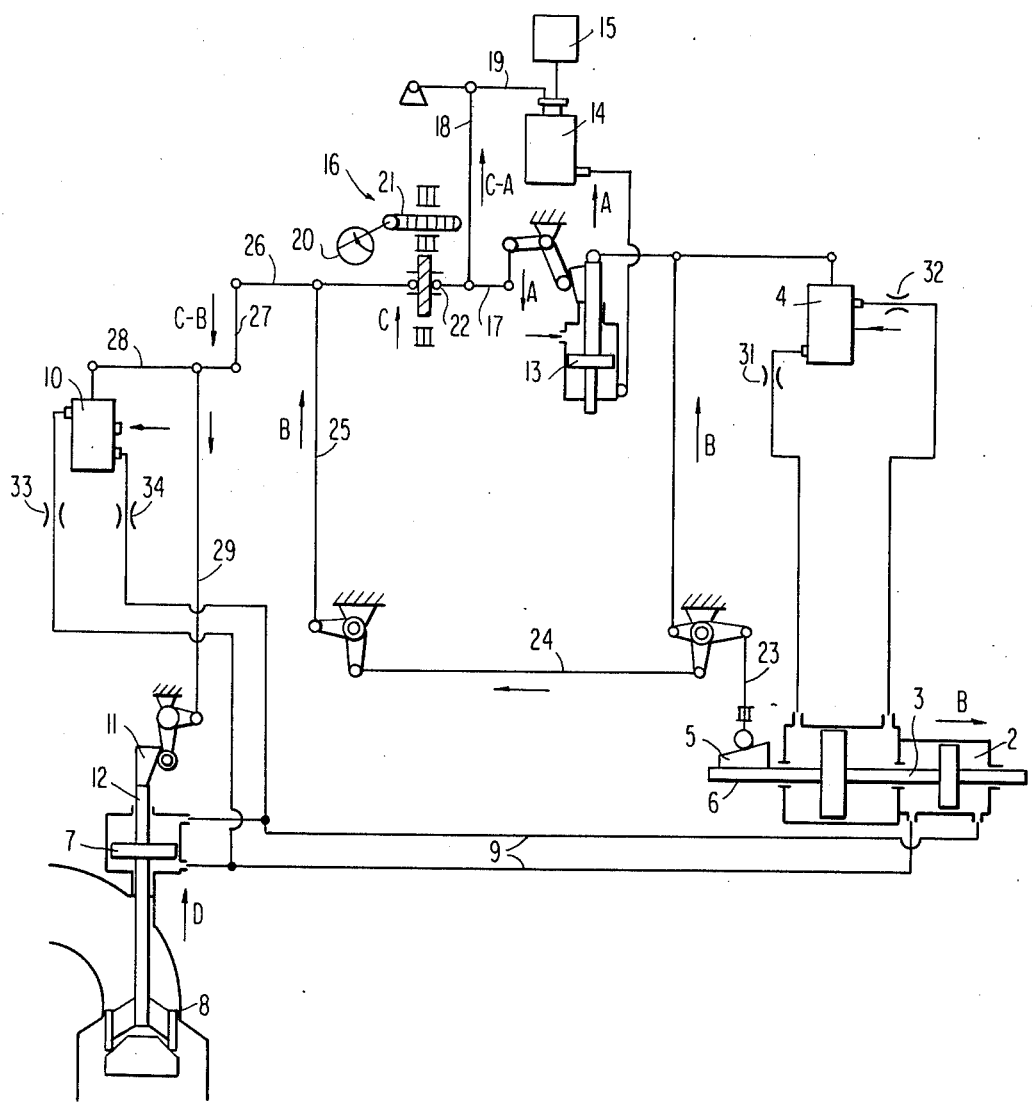

APPARATUS AND METHOD FOR CONTROLLING WATER TURBINE

BACKGROUND OF THE INVENTION

In a hydroelectric power plant, a penstock is ordinarily provided for introducing a great quantity of pressurized water into the power plant, and the flow of the pressurized water is controlled by the open-and-closing operation of the guide vanes.

In this case, the open-or-closing speed of the guide vanes must be selected extremely carefully, and when the speed is too fast unallowable high or low pressure is created in the penstock due to a water hammering effect. Thus, in the case of a comparatively long penstock, the open-or-closing speed of the guide vanes is made considerably slow. However, such a slow operation of the guide vanes is not advantageous for the governor control of the water turbine, and there exists a possibility of causing unstable operation of the governor or an excessive speed-rise in rotation of the water-turbine.

For overcoming the above described difficulty, a pressure regulator has been provided in the power plant, which quickly opens when the guide vanes are to be closed at a high speed and then gradually closes under the action of a dash-pot. However, the pressure regulator is kept closed when the guide vanes are being opened.

However, the pressure regulator of the conventional arrangement is not free from the possibility of being inoperative at the time the guide vanes are being closed at a high speed due to trouble occurring in the dash-pot or in a pressurized fluid distrubuting valve for the pressure regulator. This necessitates that the penstock must be designed in consideration of the possibility of being subjected to a high-pressure caused by the inoperation of the pressure regulator, and the merit of providing the pressure regulator is greatly reduced.

For eliminating the above described drawbacks of the known arrangement, there has been made a proposal wherein an auxiliary servomotor having a capacity substantially equal to that of the guide-vane servomotor is further provided for the pressure regulator, the auxiliary servomotor and the guide-vane servomotor being connected through pipe lines, and in the normal operation of the water turbine, the guide vanes are open-or-closed at a slow speed while the pressure regulator is completely closed. But in the case when the guide vanes are required to be closed at a high speed, the pressure regulator is quickly opened, the quick opening of the pressure regulator is transferred to the guide-vane servomotor through the auxiliary servomotor and the pipe lines, so that the guide vanes are closed at a high speed.

According to this proposal, however, the water turbine must always be operated in a load-limiting state, thereby sacrificing the speed-regulating function of the governor. Such features are of course not desirable in the operation of an electrical power network, and the fully loaded operation of the individual power plant is thereby made impossible.

In order to eliminate the above described drawbacks of the known arrangement, there has been a proposal wherein an auxiliary servomotor having a capacity substantially equal to that of a servomotor for guide vanes is used for a pressure regulator the auxiliary servomotor and the servomotor for the guide vanes being connected to each other through pipes lines, wherein the pressure regulator is controlled by the positions of an auxiliary servomotor for the governor and the servomotor for the guide vanes which are otherwise controlled by the difference between the opening position of the pressure regulator and the set position of a load limiter for the water turbine whereby, at the time of free running of the water turbine utilizing the governor, the guide vanes are operated in response to the open-and-closing operation of the pressure regulator thereby to suppress any variation in the water flowing speed in a penstock and at the time of the load-limiting operation of the water turbine the pressure regulator is fully-closed for minimizing ineffective flow of water.

According to this proposal (e.g. U.S. Pat. No. 3,891,999), however, at the time of free running of the water turbine utilizing the governor, the guide vanes must be operated by the distributing valve for the pressure regulator through the pressure regulator, the auxiliary servomotor for the pressure regulator and pipe lines connecting the auxiliary servomotor for the pressure regulator and the guide vane servomotor, thereby sacrificing sensibility of the movement of the guide vanes and hence the stability of the water turbine operation.

SUMMARY OF THE INVENTION

This invention is directed to overcome all of the difficulties in the conventional devices and proposals. According to this invention, the pressure regulator is always closed or opened at a high speed whenever the guide vanes are quickly opened or closed, whereby not only the construction cost of the hydroelectric power plant is somewhat reduced and the operation thereof is stabilized, but also free running of the water turbine under the control of the governor is made possible.

An auxiliary servomotor having a capacity substantially equal to that of a servomotor for pressure regulator is provided for a guide vane, the auxiliary servomotor for the guide vanes and the servomotor for the pressure regulator are connected through pipe lines, the guide vanes are controlled by the positions of an auxiliary servomotor for the governor, the pressure regulator are controlled by the difference between the opening position of the guide vanes and the set position of a load limiter for the water turbine, whereby at the time of free running of the water turbine utilizing the governor, the pressure regulator is operated in response to the open-and-closing operation of the guide vanes thereby to suppress any variation in the water flowing speed in a penstock, and at the time of the load-limiting operation of the water turbine, the pressure regulator is fully closed for minimizing ineffective flow of water.

BRIEF DESCRIPTION OF THE DRAWING

The FIGURE shows a schematic diagram of the apparatus according to the present invention.

DETAILED DESCRIPTION OF THE INVENTION

The invention will now be described in detail with reference to the accompanying drawing.

In the single figure showing an embodiment of the present invention, numeral 1 designates a guide vane servomotor for operating the guide vanes of the water turbine (not shown), and numeral 2 designates an auxiliary servomotor for the guide vanes. The capacity of the auxiliary servomotor for the guide vanes is far smaller than that of the guide vane servomotor 1, but is substantially equal to the capacity of the pressure regulator servomotor hereinafter described. Furthermore, the piston in the guide vane servomotor 1 and the piston in the guide vane auxiliary servomotor 2 are rigidly connected together. Numeral 4 designates a main distribution valve for the guide vane servomotor 1. Numeral 5 is a return cam provided on a rod 6 of the piston in the servomotor 1. Numeral 7 is the pressure regulator servomotor for operating the pressure regulator 8, which is connected through pipe lines 9 to the guide vane auxiliary servomotor 2. Numeral 10 designates a distribution valve for controlling the pressure regulator servomotor 7, and numeral 11 is a return cam provided on the piston rod 12 of the pressure regulator servomotor 7.

Numeral 13 designates a governor auxiliary servomotor, and numeral 14 designates a primary distribution valve for controlling the governor auxiliary servomotor 13, which valve 14 is controlled from a speed detecting device 15 and a load limiting device 16 through links 17, 18 and 19. The load limiting device 16 is composed of an electric motor 20, a worm gear 21, and a screw-driven nut 22.

The movement of the guide vane servomotor 1 is transmitted through the return cam 5 and links 23 through 28 to the distribution valve 10 for the pressure regulator servomotor 7. The movement of the screw-driven nut 22 in the load limiting device 16 is transmitted through links 26 through 28 to the pressure regulator distribution valve 10. In the drawing, a flow restrictor 31 and 32 are provided for determining the open-or-closing speed of the guide vane servomotor 1, flow restrictors 33 and 34 are provided for setting the open-or-closing speed of the pressure regulator. By these flow restrictors, the open-or-closing period of the pressure regulator is set to be more than 10 times of that of the guide vane, and to be somewhat shorter than the open-or-closing period of the load limiting device 16.

The operation of the water turbine control device according to the present invention will now be described herein below.

Assuming that the movement of the governor auxiliary servomotor 13 is A, the movement of the guide vane servomotor 1 is B, the set position of the load limiting device 16 is C, and the movement of the pressure regulator servomotor 7 is D, and that the arrow marks associated with these A, B, C and D indicates the directions rendering 100% opening of the respective units, a relation of A=B is maintained because this movement A is given to the main distributing valve 4 for the guide vane servomotor 1. Furthermore, since the difference between the movement C of the load limiting device 16 and the movement B of the guide vane servomotor 1, i.e. (C−B), is given to the pressure regulator distribution valve 10 as its controlling value, a relation of D=C−B is obtained. This can be rewritten to D=C−A in view of the above described relation A=B.

At the time of load-limiting operation of the water wheel, only the movement C of the load limiting device 16 is given to the primary distribution valve 14 for the governor as its commanding amount through the links 17 through 19, so that a relation C=A is obtained. From this relation and the above described relation D=C−A, a relation of D=0 is obtained. This means that the pressure regulator is always closed during the load-limiting operation of the water turbine and the wasteful flow of water through the pressure regulator can thereby be prevented. In this operation, any excessive pressure rise in the penstock can be prevented by slow open-or-closing of the load limiting device 16.

At the time of free-running of the water turbine utilizing the governor, if the load limiting device 16 is set at a position C corresponding to a far greater load than that of expected, only the command from the speed detecting device 15 is given to the primary distribution valve 14 for the governor. Thus the amount A cannot be equal to C, and the guide vane servomotor 1 quickly opens and closes the guide vane for discharging water of an amount corresponding to A.

On the other hand, the movement of the pressure regulator servomotor 7 coupled with the guide vane servomotor 1 through auxiliary servomotor 2 and the pipe lines 9 is equal to C−B, and this means that an amount of water corresponding to C−B flows through the pressure regulator 8. When it is assumed that the amounts of water flowing through the guide vanes and the pressure regulator 8 at the time of their 100% opening are equal to each other, the sum of the amounts of water flowing through the water turbine and the pressure regulator is maintained at a value corresponding to C, and hence the pressure rise in the penstock can be minimized.

According to the present invention, the load-limiting operation and the governor controlled free-running of the water turbine are thus made possible. Furthermore, because the pressure regulator servomotor 7 and auxiliary servomotor 2 are connected together through the pipe lines, and the open-or-closing period of the pressure regulator is set by the restrictor 33 and 34 at about ten times longer than that of the guide vanes 1, the pressure regulator can surely cooperate with the guide vane servomotor 1 regardless of the quick open-or-closing operation of the guide vane servomotor 1 and of any possible failure of the pressure regulator distribution valve 10. For this reason, the delay time of the operation of the pressure regulator from that of the guide vane servomotor 1 can be minimized, and the pressure rise in the penstock can be surely suppressed to a minimum value.

What is claimed is:

1. In an apparatus for controlling the flow control guide vanes of a penstock which directs the water flow to a water turbine power generating device, said guide vanes being movable between an open and a closed position, including a pressure regulator for controlling the water pressure in said penstock, a first actuating means connected to said guide vanes for selectively moving said vanes between an open and a closed position, a second actuating means connected to said pressure regulator for selectively regulating the pressure in said penstock, a third actuating means connected to said first actuating means and said second actuating means, a control means for controling said first and second actuating means in response to the load or speed of said water turbine, and linkage means for interconnecting said first actuating means and said second actuating means with each other and with said control means such that when the speed of closing said guide vanes exceeds a predetermined level, said pressure regulator being opened to reduce the pressure build up in said penstock, an improvement characterized by said control means controlling said first actuating means directly.

2. The apparatus of claim 1 wherein said first actuating means comprises;

(a) a hydraulic servomotor mechanically connected to said guide vanes to open and close said vanes,
(b) a control valve hydraulically connected to said hydraulic servomotor to control the movement thereof and mechanically connected to said linkage means, and
(c) said hydraulic servomotor being mechanically interconnected with said third actuating means.

3. The apparatus of claim 2 wherein the mechanical connection between the hydraulic servomotor and the guide vanes is further connected to said linkage means.

4. The apparatus of claim 1 wherein said second actuating means comprises;
(a) a hydraulic servomotor mechanically connected to said pressure regulator,
(b) a distribution valve hydraulically connected to said hydraulic servomotor to control the movement of said hydraulic servomotor, and mechanically connected to said linkage means.

5. The apparatus of claim 4 wherein the mechanical connection between the hydraulic servomotor and the pressure regulator is further connected to said linkage means.

6. The apparatus of claim 1 wherein said third actuating means comprises a hydraulic servomotor mechanically connected to said first actuating means and hydraulically connected to said second actuating means.

7. The apparatus of claim 1 wherein said control means comprises;
(a) a load limiting device for controlling the load placed on said water turbine,
(b) a speed sensing device to sense the rotational speed of said water turbine,
(c) a governor auxiliary hydraulic servomotor having its output shaft mechanically connected to said linkage means, and
(d) a primary distribution valve mechanically connected to said load limiting device and said speed sensing device and hydraulically connected to said governor auxiliarly hydraulic servomotor to control the position of said governor auxiliary servomotor in response to the outputs of the load limiting and speed sensing devices.

8. A method of controlling the water turbine is characteristic of,
(a) sensing the speed of rotation of said water turbine,
(b) actuating a governor auxiliary servomotor in response to the speed of rotation of said water turbine,
(c) detecting the set position of a load limiting device,
(d) actuating a guide vanes by the said governor auxiliary servomotor,
(e) actuating pressure regulator by the difference between the position of said guide vanes and the set position of load limiting device.

* * * * *